(12) United States Patent
Ludlam et al.

(10) Patent No.: US 8,730,695 B1
(45) Date of Patent: May 20, 2014

(54) LOAD BALANCING METHOD AND SYSTEM TO SCALE DC OUTPUT POWER BY TEMPERATURE OF PARALLEL DC POWER SUPPLIES

(75) Inventors: Kevin Ludlam, Marlborough, MA (US); Jonathan C. Crowell, Dorchester, MA (US)

(73) Assignee: Ocean Server Technology, Inc., Fall River, MA (US)

( * ) Notice: Subject to any disclaimer, the term of this patent is extended or adjusted under 35 U.S.C. 154(b) by 1882 days.

(21) Appl. No.: 11/679,549

(22) Filed: Feb. 27, 2007

Related U.S. Application Data (60) Provisional application No. 60/778,433, filed on Mar. 2, 2006.

(51) Int. Cl.
*H02M 7/23* (2006.01)
*H02M 3/158* (2006.01)

(52) U.S. Cl.
USPC .......................................................... 363/65

(58) Field of Classification Search
USPC .......................................................... 363/65
See application file for complete search history.

(56) References Cited

U.S. PATENT DOCUMENTS

| | | | |
|---|---|---|---|
| 4,149,233 A | 4/1979 | Frosch et al. | |
| 4,635,178 A | 1/1987 | Greenhalgh | |
| 5,036,452 A | 7/1991 | Loftus | |
| 5,164,890 A | 11/1992 | Nakagawa et al. | |
| 5,740,023 A | 4/1998 | Brooke et al. | |
| 5,838,151 A * | 11/1998 | Myers et al. | 323/353 |
| 5,847,550 A * | 12/1998 | Schie et al. | 323/222 |
| 6,137,274 A | 10/2000 | Rajagopalan | |
| 6,768,658 B2 | 7/2004 | Perry | |

* cited by examiner

*Primary Examiner* — Harry Behm
*Assistant Examiner* — Matthew Grubb
(74) *Attorney, Agent, or Firm* — Nutter McClennen & Fish LLP; Ronald E. Cahill (57) ABSTRACT

A system and a method are provided that allow load sharing between two or more DC output power supplies that are connected in parallel to scale the output power. As the temperature of the critical components in a power supply rises, the output voltage from that power supply will be lowered, so that the coolest supply will have the highest voltage and thus the highest current to the load. The systems and methods can operate without any additional wires connecting the supplies other than those supplying the power to the load.

20 Claims, 8 Drawing Sheets

FIG. 1

*PRIOR ART*

FIG. 2

PRIOR ART

| Module | Vout  | Module temp | Iout |
|--------|-------|-------------|------|
| A      | 24.4V | 28 C        | 0.0A |
| B      |       | 28 C        | 0.0A |
| A      | 24.4V | 34 C        | 2.4A |
| B      |       | 28 C        | 0.0A |
| A      | 24.4V | 50 C        | 6.8A |
| B      |       | 28 C        | 0.0A |
| A      | 24.4V | 65 C        | 9.2A |
| B      |       | 28 C        | 0.0A |

*Table 1*: Two LT3782 reference design circuits load sharing connected in parallel for the purpose of load sharing; No significant load sharing occurs.

FIG. 7

| Module | Vout  | Module temp | Iout |
|--------|-------|-------------|------|
| A      | 24.4V | 25 C        | 0.0A |
| B      |       | 25 C        | 0.0A |
| A      | 24.3V | 30 C        | 1.3A |
| B      |       | 30 C        | 0.6A |
| A      | 24.1V | 41 C        | 3.2A |
| B      |       | 38 C        | 3.4A |
| A      | 24.0V | 45 C        | 4.0A |
| B      |       | 44 C        | 4.9A |

*Table 2*: Same LT3782 Reference design as for Table 1, but with the thermistor in place near the critical heat-generating components according to the invention; Modules share the load requirement while balancing the temperature.

FIG. 8

| Module | Vout | Module temp | Iout | Airflow |
|--------|------|-------------|------|---------|
| A | 24.0V | 45 C | 4.0A | No |
| B |  | 44 C | 4.9A | No |
| A | 24.4V | 40 C | 2.5A | No |
| B |  | 37 C | 6.6A | Yes |

*Table 3*: Two cases of sharing, one test with no airflow and the other only one module gets airflow.

LOAD BALANCING METHOD AND SYSTEM TO SCALE DC OUTPUT POWER BY TEMPERATURE OF PARALLEL DC POWER SUPPLIES

RELATED APPLICATIONS

This application claims priority to U.S. Provisional Patent Application Ser. No. 60/778,433, entitled "Load Balancing Method and System For DC Power Supplies Used in Parallel To Scale Output Power," filed on Mar. 2, 2006, which application is hereby incorporated herein by reference in its entirety.

FIELD OF INVENTION

The present invention relates to the field of DC-DC and AC-DC power conversion, and more particularly, to controlling the output of DC output power converter modules.

BACKGROUND OF THE INVENTION

DC to DC converters are important in portable electronic devices such as cellular phones and laptop computers, which are supplied with power from batteries. Such electronic devices often contain several sub-circuits which each require unique voltage levels different than supplied by the battery (sometimes higher or lower than the battery voltage, or even negative voltage). Additionally, the battery voltage declines as its stored power is drained. DC to DC converters offer a method of generating multiple controlled voltages from a single variable battery voltage, thereby saving space instead of using multiple batteries to supply different parts of the device.

Electronic switch-mode DC to DC converters are available to convert one DC voltage level to another. These circuits, very similar to a switched-mode power supply, generally perform the conversion by applying a DC voltage across an inductor or transformer for a period of time (usually in the 100 kHz to 5 MHz range) which causes current to flow through it and store energy magnetically, then switching this voltage off and causing the stored energy to be transferred to the voltage output in a controlled manner. By adjusting the ratio of on/off time, the output voltage can be regulated even as the current demand changes. This conversion method is more power efficient (often 80% to 95%) than linear voltage conversion which must dissipate unwanted power. This efficiency is beneficial to increasing the running time of battery operated devices. A drawback to switching converters is the electronic noise they generate at high frequencies, which must sometimes be filtered.

There are several known techniques for controlling the switching device(s) of a switched-mode converter. In conventional current mode DC-DC converters, the duty cycle of the switching device of the converter is modulated by a negative feedback voltage loop to maintain the desired output voltage. The negative feedback loop ordinarily includes a voltage error amplifier that compares a signal indicative of the output voltage to a reference voltage. In typical current mode control circuits, when the sum of the sensed transformer current and the compensating ramp from the voltage error amplifier exceed an error current signal, a latch is reset and the switching device is turned OFF.

To enhance power-processing density, or to meet increased current demands of the load, it is often desirable to connect several switch-mode converters in parallel. In a typical paralleled switch-mode converter configuration, each converter is designed to contribute an equal amount of current to the load in the presence of inevitable variations in reference voltages and component values. Several techniques for enhancing current sharing between paralleled converters are known, as is evidenced in the following U.S. Pat. No. 6,768,658 (DC-DC power supply with at least two paralleled converters and current share method for same); U.S. Pat. No. 6,137,274 (Switching DC-to-DC converter and conversion method with current sharing between paralleled channels); U.S. Pat. No. 5,838,151 (Wireless load sharing for parallel power converters and method); U.S. Pat. No. 5,740,023 (Control system for a modular power supply and method of operation thereof); U.S. Pat. No. 5,164,890 (Current share scheme for parallel operation of power conditioners); U.S. Pat. No. 5,036,452 (Current sharing control with limited output voltage range for paralleled power converters); U.S. Pat. No. 4,635,178 (Paralleled DC power supplies sharing loads equally); and U.S. Pat. No. 4,149,233 (Circuit for automatic load sharing in parallel converter modules).

One control technique is to derive a share function that uses a sensor amplifier to generate a share bus that is proportional to the total load current. A slow speed servo loop can then adjust the voltage loop of each converter to force balance of the load current between the paralleled converters.

One state of the art load sharing controller is the LTC4350 from Linear Technology Corporation of Milpitas, Calif. The datasheet for this device is attached to the Provisional Application to which this application claims priority as an Appendix, and a typical application of the LTC4350 controller is provided in FIG. 1. The LTC4350 is a load share controller that allows systems to equally load multiple power supplies connected in parallel. The output voltage of each supply is adjusted using the SENSE+ input until all currents match the share bus. This concept is typical for the control of commercial DC-DC converters or AC-DC converters that are marketed today. They generally have an extra signal connected between each of the supplies that will source the shared load. The connection of the Linear Tech LTC4350 can be seen in as the "Share Bus" FIG. 1.

Figure 2:
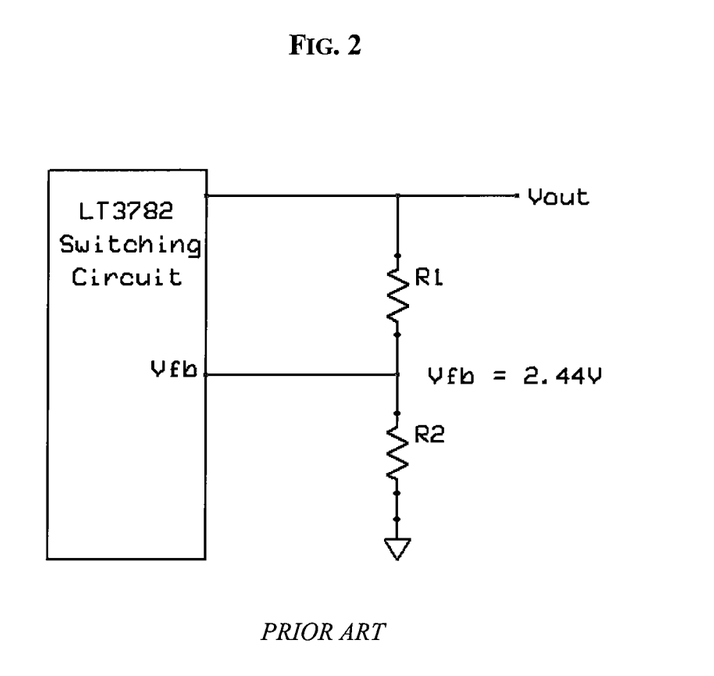
FIG. 2 provides a diagram of a conventional DC power conversion module have feedback control.

A further, simpler, known control scheme for controlling the output converters provided in parallel can be described with respect to FIG. 2, which illustrates an LTC3782 DC-DC converter from Linear Technology Corporation (a data sheet for this device is also included in the Appendix to the Provisional Application from which this application claims priority), and, in particular, a feedback voltage divider network used with this device. The output voltage of the circuit is set based on the input of this voltage divider to a feedback pin on the converter—the ratio of R1/R2 determines the output voltage of the circuit.

In addition, this device includes a feature, common to many converter circuits, that lowers the voltage when the output current is at its maximum allowable value. This "fold back" protects the circuits by lowering the output voltage, and in turn hoping the output current lowers to an allowable level.

When a conventional pair of converter circuits, such as two LTC3782s, are connected in parallel to load share, one device will typically source all of the current output from the pair. This is due to slight differences in the output voltage between the circuits and the high gain error amplifiers that help control the output voltage. The circuit with the slightly higher output voltage will supply the power. When the regulator supplying the current reaches its current limit, it starts to fold back the output voltage. When the output voltage lowers enough to match the output voltage of the second circuit sharing the load, the second circuit will start increasing its current as the load current demand increases. This crude form of current sharing will force the circuit with the slightly higher output voltage to do most of the work.

While this control scheme is considered a crude one for a number of reasons, it does have the advantages of being relatively inexpensive to implement and it does not require additional wiring between the converters. If load share controller circuits were added, such as the LTC4350 shown in FIG. 1, these circuits would current share with the addition of an extra wire and all the required circuits.

One object of the present invention is to provide better load sharing results without adding extra wires or connections.

SUMMARY OF THE INVENTION

The present invention describes a method and system for controlling the output of a converter module based on a measured temperature of the module. The invention can find beneficial use in systems where a plurality of converter modules are connected in parallel to a load in order to load balance among the modules.

In one aspect, the invention provides a method for controlling a converter module in a system having a plurality of converter modules connected in parallel to a load. The method includes measuring the temperature of a thermistor coupled to a converter module; and controlling the output of the converter module based on a measured temperature of the thermistor coupled to the converter module. In one embodiment of this aspect of the invention, the DC output converter has a feedback input used to set the output voltage from the converter, and a voltage divider circuit having a thermistor is connected to the feedback input and configured so that the voltage at the feedback input depends on the temperature of the thermistor. Where the DC output converter is a switched converter, the thermistor can be located proximate to at least one of an inductor and a switch of the converter.

In a further aspect of the invention, a converter module having a temperature based controller provided. The module includes a DC output converter having a feedback input used to set the output voltage from the converter and a voltage divider circuit connected to the feedback input. The voltage divider circuit includes a thermistor and is configured so that the voltage at the feedback input depends on the temperature of the thermistor.

In a still further aspect of the invention, a DC output converter system is provided having a plurality of DC output converter modules connected in parallel to a load. Each converter module includes a DC output converter having a feedback input used to set the output voltage from the converter and a voltage divider circuit connected to the feedback input. The voltage divider circuit includes a thermistor so that the voltage at the feedback input depends on the temperature of the thermistor.

DETAILED DESCRIPTION

Many conventional power supply sharing schemes provide a control circuit that tunes the output voltage of each of the power output devices to a point where the current required by the load is coming equally from each of the "n" circuits in the sharing arrangement. The documentation provided with such conventional systems typically suggests that sufficient cooling be arranged for each of the power supplies or converters so that one doesn't heat more than the others.

A system and method are provided for using the measured temperature of each power output device to set or trim output voltages. As the temperature of a converter module increases, the output voltage is lowered. This will cause the module with increasing temperature to put out less current than other converter modules feeding a parallel-connected network. The "n" devices sharing the load will all come into equilibrium at the point where the circuit temperatures are all balanced. Since currents ramp up instantaneously and thermal heating is relatively slow, built in current limiting circuits in the converter modules act first if the current will force one circuit to the limit quickly. That converter module will back down in seconds when the temperatures all soak towards steady state, and the so-called mechanism of voltage fold back at the current limit will keep the modules operating within desired specifications. The control scheme of the invention can even be a way of load sharing at time T=0 of a load change.

Figure 3:
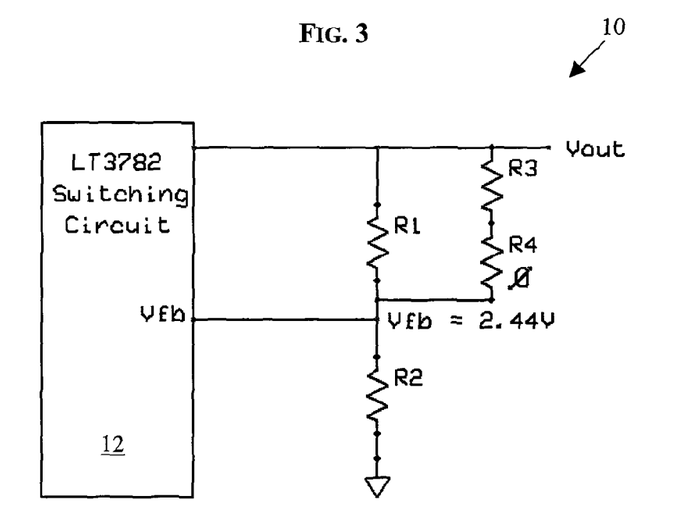
FIG. 3 provides a diagram of a controlled DC power conversion module of the invention applying a control circuit to the switching circuit of the device of FIG. 2.
Figure 3A:
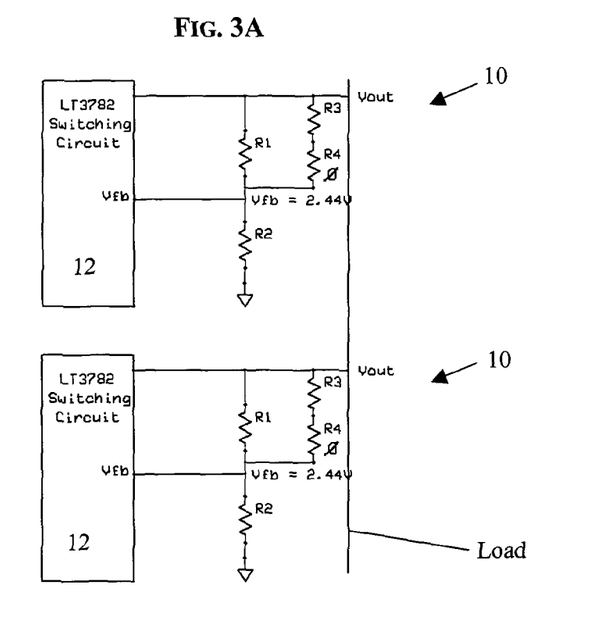
FIG. 3A provides a diagram of a plurality of controlled DC power conversion modules of FIG. 3, connected in parallel to a load.

Referring now to FIG. 3, an embodiment of a system 10 of the invention using a converter 12 is illustrated. In this embodiment, the converter 12 is an LTC3782 converter. Resistors R3 and R4 can be added to the network and can be used to set the output voltage of the system 10. R3 can be a fixed resistor, while R4 is a thermistor. A person skilled in the art will appreciate that while an LTC3782 converter is illustrated, any suitable converter can be used with the present invention.

Figure 4:
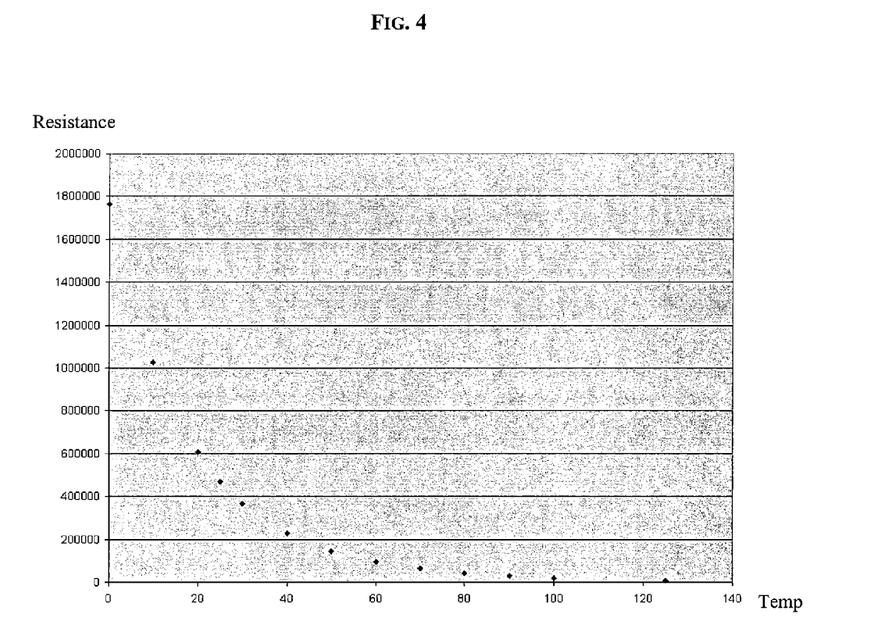
FIG. 4 illustrates the resistance values versus temperature for a thermistor used in the control circuit of FIG. 3.

A thermistor is a type of resistor used to measure temperature changes, relying on the change in its resistance with changing temperature. For relatively small temperature changes, thermistors can be modeled by assuming that the relationship between resistance and temperature is linear (i.e., a first-order approximation):

$$\Delta R = k \Delta T$$

where
$\Delta R$=change in resistance
$\Delta T$=change in temperature
k=first-order temperature coefficient of resistance Accordingly, where k is negative (as it is in a preferred embodiment of the invention), the resistance of R4 decreases when temperature increases. FIG. 4 shows a chart for a thermistor used in an embodiment of the invention showing higher order characteristics for the actual thermistor for a wider temperature range.

In the control scheme illustrated in FIG. 3, when parallel modules are cooled equally well, current will be shared equally. The differences in current output are based on the slight differences in the output voltage of each regulator. The current sharing is equivalent to the behavior of the circuit shown in FIG. 1. If modules are not cooled equally, the module that has the best cooling will be the module that outputs the most power. This reduces the stress on the module that is in the hotter location and both modules will be at roughly the same temperature. The different converter modules in a parallel system will remain at the same temperature until one or the other module reaches its current limit. At that point any additional current will come from the other circuit.

In this circuit, the thermistor R4 can be placed close to the components that will generate the most heat. For a switching-type converter or regulator, the components that generate the most heat would be the inductors and switches. As the power output increases, the inductors and switches will heat up causing R4 to heat up. As R4 heats up, it will reduce its resistance, causing the output voltage to be reduced. This will reduce the output voltage from this circuit well before the circuit reaches its maximum power output. This in turn will cause a second parallel circuit to increase its output power to share the load.

Figure 1:
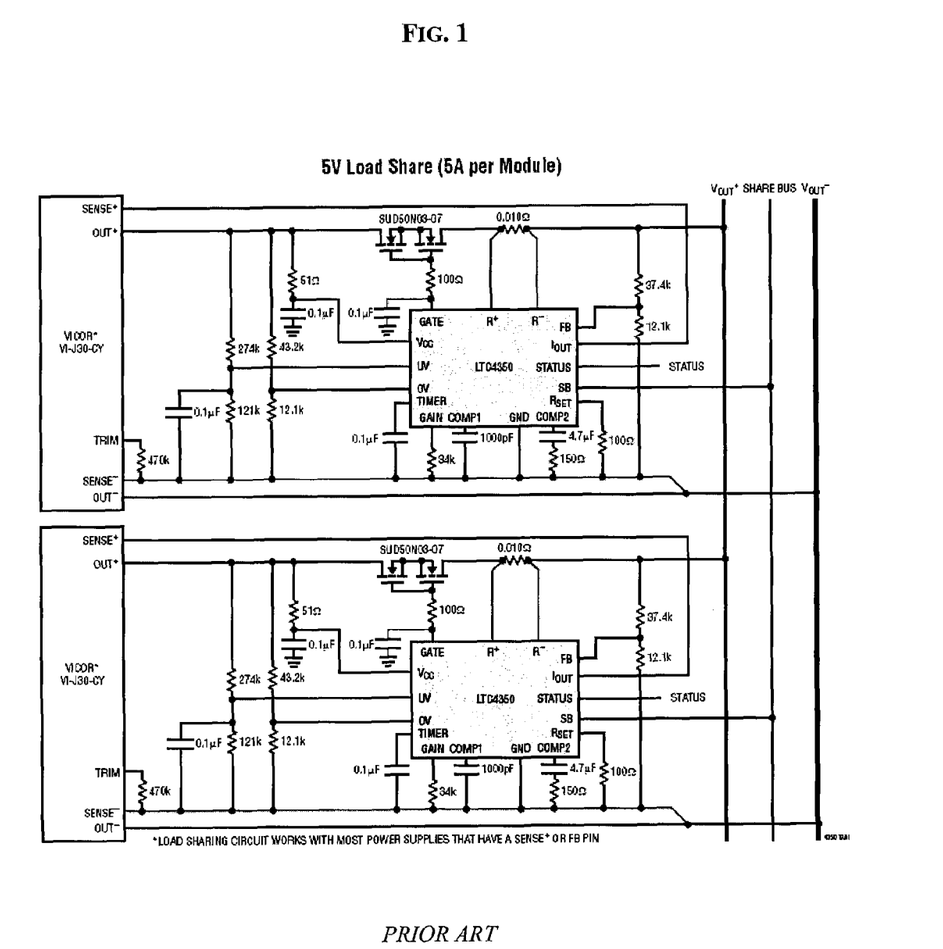
FIG. 1 provides a diagram of a conventional DC power conversion module controlled using a share bus.

Comparing the control system of the invention illustrated in FIG. 3 to a state of the art conventional controller such as the LTC4350 illustrated in FIG. 1, the system of the invention can include some or all of the following advantages:

The controller of the present invention is up to two orders of magnitude smaller;

The cost to implement the controller of the invention can be more than one order of magnitude less;

The need for a third "share" wire with its increased complexity to implement is reduced or eliminated;

The parallel converters can operate completely independently; and

The stress on circuits that are in hotter locations is relieved relative to other circuits.

In the conventional voltage divider control configuration (illustrated in FIG. 2), the output of the converter is as follows:

$$Vout=2.44\times(1+(R1/R2)) \qquad \text{(Equation 1)}$$

In the configuration of the invention illustrated in FIG. 3, the compensation resistance and R1 equivalent can be defined as $$Rc=R3+R4 \qquad \text{(Equation 2)}$$

$$Req=(R1\times Rc)/(R1+Rc) \qquad \text{(Equation 3)}$$

Replacing R1 with Req in Equation 1 gives the output for the system of FIG. 3 as:

$$Vout=2.44\times(1+(Req/R2)) \qquad \text{(Equation 4)}$$

Figure 5:
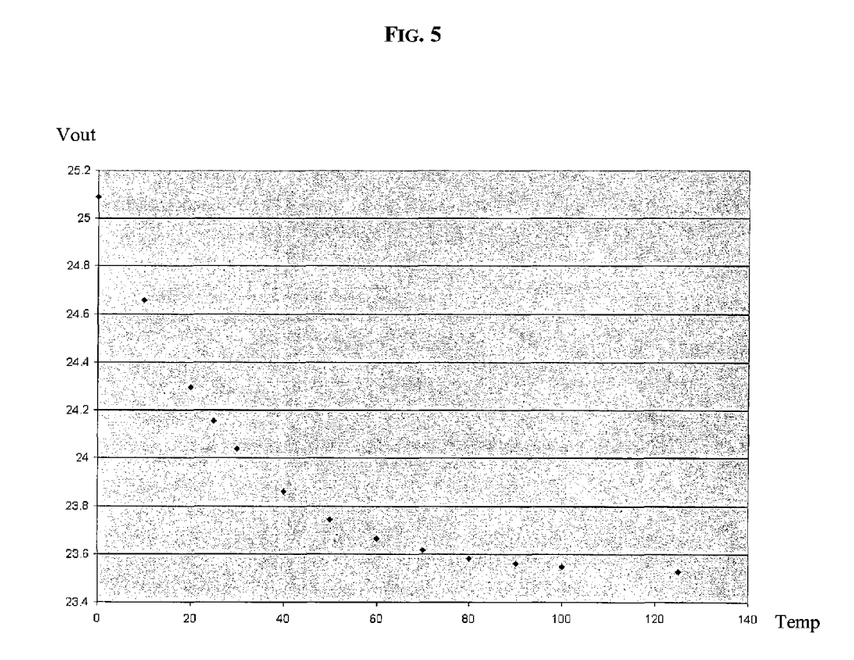
FIG. 5 illustrates the voltage output of the DC power conversion module of FIG. 3 versus temperature.

As an example, if in FIG. 3 the values for the resistors in Ohms are: R1=267K, R2=26.7K, R3=1.69M, and R4=470K; then at a room temperature of 25 degrees C. (and using thermistor part no. NCP18WM474J03RB available from Murata Manufacturing Co. of Kyoto, Japan), the output voltage will be 24.16V. As the circuit heats up and causing R4 to heat up, the voltage output will drop to 24.04V when R4 is at 30 degrees C. The 120 mV drop is enough for the second circuit in the above example to start outputting power and sharing the load. By controlling the value of the offset resistor (R3), the influence of the thermistor can be adjusted to make the circuit either more or less sensitive to the affects of the temperature. In the above circuit, the output will vary by about 540 mv between the thermistor temperatures of 25 and 70 degrees C. Between 0 and 100 degrees C., the voltage will change by about 1.54V. FIG. 4 shows how the resistance of R4 changes as temperature rises in this example, and FIG. 5 shows how the output voltage will change as temperature rises.

Figure 6:
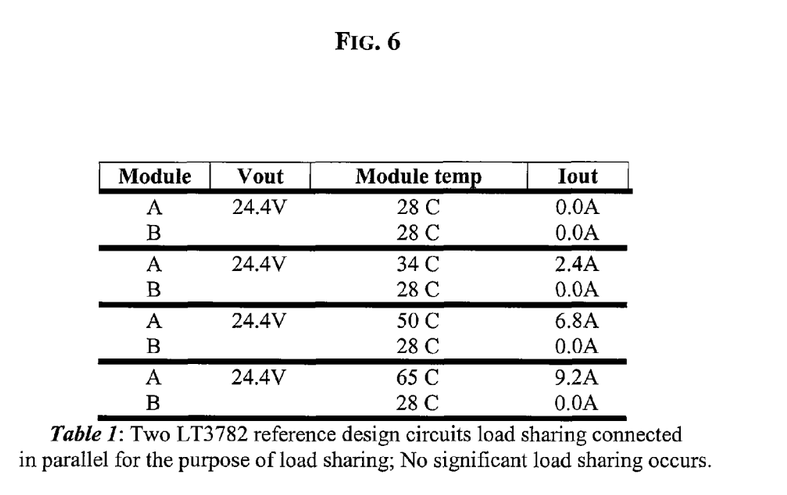
FIG. 6 provides Table 1, which presents data for two LT3782 reference design circuits connected in parallel for the purpose of load sharing, and shows no significant load sharing occurring.

The tables (Tables 1, 2 and 3 are provided in FIGS. 6, 7, and 8, respectively) show results from using two converter modules (Module A and Module B, each configured as illustrated in FIG. 3) in parallel (i.e., having the outputs tied together). Table 1 shows how the modules behave without the thermistor. A standard 470K ohm resistor was installed in place of the 470K ohm thermistor at position R4 of FIG. 3. When the outputs of the modules were measured separately, there was difference of about 50 mV between the two modules. This was enough to cause the module with the slightly lower voltage value to not output any current. Also, notice the temperature difference between the modules. Module B will eventually start to output current, but not until the maximum current limit of module A is reached. The higher temperature on Module A will cause more stress on the circuit.

Figure 7:
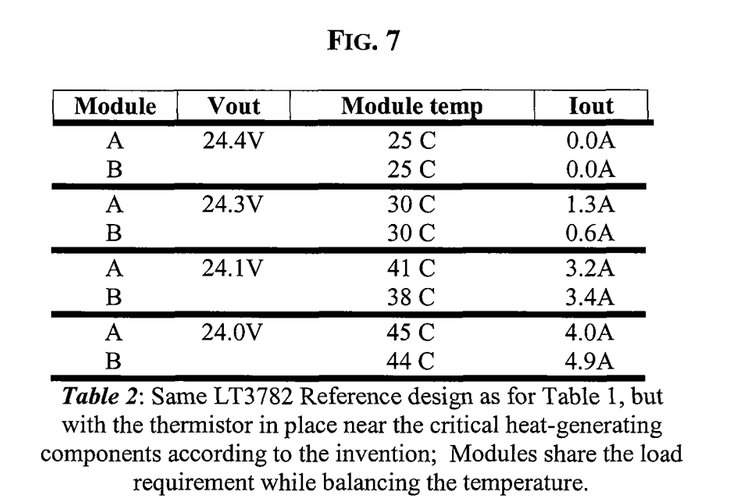
FIG. 7 provides Table 2, which presents data for the same two LT3782 reference design circuits as for Table 1, but with a thermistor in place near each module according to the invention, and shows load sharing while balancing the temperature between the modules.

In Table 2, the 470K-Ohm thermistor was installed at R4 in the system of FIG. 3. In this case, the modules share current almost equally and the temperature of the modules remains roughly the same. The voltage drops slightly as the temperature increases, but it is well within the tolerances typical for regulated power. With both modules at roughly the same temperature, no individual module is under any additional thermal stress.

This circuit allows equal current sharing between circuits even if they are not located near each other. The only common connection is the output. Another added benefit is that it can allow for better thermal management by dispersing the heat to cooler locations within an enclosure. If two circuits are placed in different locations within an enclosure, the circuit in the coolest location will tend to put out more power reducing "hot spots" within an enclosure.

Figure 8:
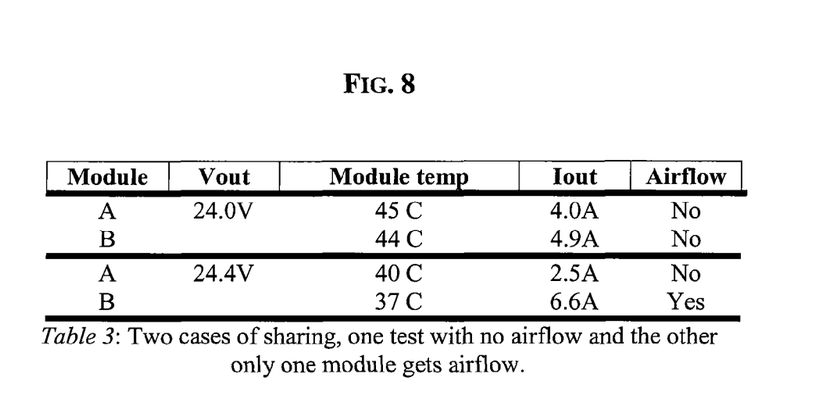
FIG. 8 provides Table 3, which presents data for modules of the invention for the case where there is no airflow for either module, and the case where there is airflow for one module.

In the first two rows in Table 3 (which, as with Table 2, presents results for two converter modules arranged per FIG. 3, in parallel with thermistors in place), modules A and B are supplying power to a load with no airflow over either module. The current is shared relatively equally and the temperature of each module is roughly the same. In the last two columns, module B has a fan providing airflow while module A has no airflow. In this case module B starts outputting more power so both modules are able maintain the same temperature. This will reduce thermal stress on the modules and help keep heat from building up in one spot of the system by distributing the heat between the modules. One can see that even though module B is outputting more power, it is cooler than module A.

A person of ordinary skill in the art will appreciate further features and advantages of the invention based on the above-described embodiments. For example, specific features from any of the embodiments described above or the priority application (including its Appendix) may be incorporated into devices or methods of the invention in a variety of combinations and subcombinations, as well as features referred to in the claims below which may be implemented by means described herein. Accordingly, the invention is not to be limited by what has been particularly shown and described, except as indicated by the appended claims or those ultimately provided. Any publications and references cited herein are expressly incorporated herein by reference in their entirety.

The invention claimed is:

1. A DC output converter system comprising:
a plurality of DC output converter modules connected in parallel to a load, each converter module including:
a DC output converter having a feedback input used to set the output voltage from the converter; and
a voltage divider circuit connected to the feedback input, the voltage divider circuit including a thermistor whereby the voltage at the feedback input depends on the temperature of the thermistor.

2. The system of claim 1, wherein the voltage divider circuits include a resistor placed in series with the thermistor to attenuate temperature effects on module output voltage.

3. The system of claim 2, wherein the thermistor is in parallel with a resistor as part of each voltage divider circuit.

4. The system of claim 1, wherein the DC output converters are switched converters.

5. The system of claim 4, wherein the thermistors are located proximate to at least one of an inductor and a switch of the converters.

6. The system of claim 4, wherein the DC output converters are DC-DC converters.

7. The system of claim 4, wherein the DC output converters are AC-DC converters.

8. A method of controlling a converter module in a system having a plurality of converter modules connected in parallel to a load, the method comprising:
measuring the temperature of a thermistor coupled to a converter module; and
controlling the output of the converter module based on the measured temperature of the thermistor coupled to the converter module;
wherein the converter module is a DC output converter;
wherein the DC output converter has a feedback input used to set the output voltage from the converter, and a voltage divider circuit having the thermistor is connected to the feedback input and configured so that the voltage at the feedback input depends on the temperature of the thermistor;
wherein the DC output converter is a switched converter; and
wherein the thermistor is located proximate to at least one of an inductor and a switch of the converter.

9. The method of claim 8, wherein the DC output converter is a DC-DC converter.

10. The method of claim 8, wherein the DC output converter is an AC-DC converter.

11. The method of claim 8, wherein a resistor is placed in series with the thermistor to attenuate temperature effects on module output voltage.

12. The method of claim 8, wherein the thermistor is in parallel with a resistor as part of the voltage divider circuit.

13. A method of controlling a converter module in a system having a plurality of converter modules connected in parallel to a load, the method comprising:
measuring the temperature of a thermistor coupled to a converter module; and
controlling the output of the converter module based on the measured temperature of the thermistor coupled to the converter module;
wherein the converter module is a DC output converter;
wherein a plurality of converter modules are connected in parallel to a load, and the output of each converter module is controlled based on a measured temperature of each converter module.

14. The method of claim 13, wherein each DC output converter has a feedback input used to set the output voltage from the converter, and a voltage divider circuit having the thermistor is connected to the feedback input and configured so that the voltage at the feedback input depends on the temperature of the thermistor.

15. The method of claim 14, wherein each DC output converter is a switched converter.

16. The method of claim 15, wherein the thermistor is located proximate to at least one of an inductor and a switch of each converter.

17. The method of claim 13, wherein each DC output converter is a DC-DC converter.

18. The method of claim 13, wherein each DC output converter is an AC-DC converter.

19. The method of claim 14, wherein a resistor is placed in series with the thermistor to attenuate temperature effects on module output voltage.

20. The method of claim 14, wherein the thermistor is in parallel with a resistor as part of the voltage divider circuit.

* * * * *